(12) United States Patent
Jiang et al.

(10) Patent No.: US 12,587,344 B2
(45) Date of Patent: Mar. 24, 2026

(54) CONFIGURATION OF RESOURCE ELEMENTS IN DEMODULATION REFERENCE SIGNALS FOR CHANNEL ESTIMATION AND DATA TRANSMISSION

(71) Applicant: ZTE CORPORATION, Shenzhen (CN)

(72) Inventors: Chuangxin Jiang, Shenzhen (CN); Zhaohua Lu, Shenzhen (CN); Hao Wu, Shenzhen (CN); Huahua Xiao, Shenzhen (CN); Meng Mei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 331 days.

(21) Appl. No.: 18/489,102

(22) Filed: Oct. 18, 2023

(65) Prior Publication Data

US 2024/0048328 A1    Feb. 8, 2024

Related U.S. Application Data

(63) Continuation of application No. PCT/CN2021/121985, filed on Sep. 30, 2021.

(51) Int. Cl.
*H04L 5/00* (2006.01)

(52) U.S. Cl.
CPC .......... *H04L 5/0051* (2013.01); *H04L 5/0016* (2013.01)

(58) Field of Classification Search
CPC ... H04L 5/0051; H04L 5/0016; H04W 72/232
See application file for complete search history.

(56) References Cited

U.S. PATENT DOCUMENTS

| | | | |
|---|---|---|---|
| 2019/0052425 A1 | 2/2019 | Kim et al. | |
| 2020/0336275 A1 | 10/2020 | Ren et al. | |
| 2023/0189262 A1* | 6/2023 | Zeineddine ........... H04L 5/0048 370/329 | |

FOREIGN PATENT DOCUMENTS

| | | | |
|---|---|---|---|
| CN | 108111275 A | 6/2018 | |
| CN | 109995498 A | 7/2019 | |
| CN | 111836368 A | 10/2020 | |
| CN | 112449413 A | 3/2021 | |
| EP | 4199405 A1 * | 6/2023 ........... H04L 5/0007 | |

OTHER PUBLICATIONS

Caict, et al., "Introduction of the 2nd Wireless communication AI competition (WAIC)", RP-212078, Sep. 13, 2021 (14 pages).

(Continued)

*Primary Examiner* — Gbemileke J Onamuti
(74) *Attorney, Agent, or Firm* — Foley & Lardner LLP

(57) ABSTRACT

Presented are systems, methods, apparatuses, or computer-readable media for configuring resource elements (REs) in demodulation reference signals (DMRSs) for data transmission. A wireless communication device may receive, from a wireless communication node, a first signaling indicating whether at least one set of a plurality of sets of resource elements of at least one demodulation reference signal (DMRS) symbol, is to be used for transmission that excludes DMRS. Each of the plurality of sets may include at least one code division multiplex (CDM) group, each of the at least one CDM group including resource elements on which corresponding DMRS ports are multiplexed.

19 Claims, 15 Drawing Sheets

605

DMRS Type 2, Two Front Loaded DMRS Symbols, 2 DMRS REs per Port per Symbol

CDM Group #5 in Which Port 16, 17, 22, 23 Are Mapped

CDM Group #4 in Which Port 14, 15, 20, 21 Are Mapped

CDM Group #3 in Which Port 12, 13, 18, 19 Are Mapped

CDM Group #2 in Which Port 4, 5, 10, 11 Are Mapped

CDM Group #1 in Which Port 2, 3, 8, 9 Are Mapped

CDM Group #0 in Which Port 0, 1, 6, 7 Are Mapped

Symbol #n    #n+1

(56)                    References Cited

OTHER PUBLICATIONS

Ericsson "Ericsson views on Rel-18," 3GPP RAN-Rel-18 workshop, RWS-210329, E-Meeting, Jun. 28, 2021 (22 pages).
Huawei, et al. "Views on studies on AI/ML for PHY," 3GPP TSG RAN Rel-18 workshop, RWS-210448, E-Meeting, Jun. 28, 2021 (4 pages).
Mediatek Inc., "MediaTek Views on Rel-18", 3GPP TSG RAN Rel-18 Workshop, RWS-210092, E-Meeting, Jun. 28, 2021 (25 pages).
CATT, "Considerations on multi-TRP/panel transmission" 3GPP TSG RAN WG1 Meeting #98, R1-1908602, Aug. 30, 2019, Prague, CZ (28 pages).
CATT, "Remaining issues on multi-TRP/panel transmission" 3GPP TSG RAN WG1 #99, R1-1912176, Nov. 22, 2019, Reno, USA (21 pages).
Huawei et al., "Remaining issues on DMRS design" 3GPP TSG RAN WG1 Meeting #93, R1-1805958, May 25, 2018, Busan, Korea (9 pages).
International Search Report and Written Opinion for PCT Appl. No. PCT/CN2021/121985, mailed Jun. 24, 2022 (8 pages).
Extended European Search Report for EP App. No. 21958827.4, dated Sep. 23, 2024 (10 pages).
KT Corp., "Discussion on remaining details of DMRS design", 3GPP TSG RAN WG1 Meeting 90bis, R1-1718271, Oct. 13, 2017, Prague, CZ (3 pages).

* cited by examiner

405

DMRS Type 2, Two Front Loaded DMRS Symbols, 4
DMRS REs per Port per Symbol

CDM Group #2 in Which Port 4, 5, 10, 11 Are Mapped

CDM Group #1 in Which Port 2, 3, 8, 9 Are Mapped

CDM Group #0 in Which Port 0, 1, 6, 7 Are Mapped

Symbol #n          #n+1

500

DMRS Type 2, One Front Loaded DMRS Symbol, 2
DMRS REs per Port per Symbol

| 11 |
| 10 |
| 9 |
| 8 |
| 7 |
| 6 |
| 5 |
| 4 |

For Data

| 5 |
| 4 |
CDM Group #2 in Which Port 4 And 5 Are Mapped

| 3 |
| 2 |
CDM Group #1 in Which Port 2 And 3 Are Mapped

| 1 |
| 0 |
CDM Group #0 in Which Port 0 And 1 Are Mapped

Symbol #n

FIG. 5A

DMRS Type 2, Two Front Loaded DMRS Symbols, 2
DMRS REs per Port per Symbol

For Data

| | |
|---|---|
| 11 | 11 |
| 10 | 10 |
| 9 | 9 |
| 8 | 8 |
| 7 | 7 |
| 6 | 6 |
| 5 | 5 |
| 4 | 4 |
| 3 | 3 |
| 2 | 2 |
| 1 | 1 |
| 0 | 0 |

CDM Group #2 in Which Port 4, 5, 10, 11 Are Mapped

CDM Group #1 in Which Port 2, 3, 8, 9 Are Mapped

CDM Group #0 in Which Port 0, 1, 6, 7 Are Mapped

Symbol #n          #n+1

DMRS Type 2, One Front Loaded DMRS Symbol, 2
DMRS REs per Port per Symbol

CDM Group #5 in Which Port 16 and 17 Are Mapped

CDM Group #4 in Which Port 14 and 15 Are Mapped

CDM Group #3 in Which Port 12 and 13 Are Mapped

CDM Group #2 in Which Port 4 and 5 Are Mapped

CDM Group #1 in Which Port 2 and 3 Are Mapped

CDM Group #0 in Which Port 0 and 1 Are Mapped

Symbol #n

605

DMRS Type 2, Two Front Loaded DMRS Symbols, 2
DMRS REs per Port per Symbol

CDM Group #5 in Which Port 16, 17, 22, 23 Are Mapped

CDM Group #4 in Which Port 14, 15, 20, 21 Are Mapped

CDM Group #3 in Which Port 12, 13, 18, 19 Are Mapped

CDM Group #2 in Which Port 4, 5, 10, 11 Are Mapped

CDM Group #1 in Which Port 2, 3, 8, 9 Are Mapped

CDM Group #0 in Which Port 0, 1, 6, 7 Are Mapped

Symbol #n          #n+1

DMRS Type 2, One Front Loaded DMRS Symbol, 2
DMRS REs per Port per Symbol

Symbol #n

705

DMRS Type 2, Two Front Loaded DMRS Symbols, 2
DMRS REs per Port per Symbol

CDM Group #2 in Which Port 4, 5, 10, 11 Are Mapped

CDM Group #1 in Which Port 2, 3, 8, 9 Are Mapped

Set 1

CDM Group #0 in Which Port 0, 1, 6, 7 Are Mapped

CDM Group #2 in Which Port 4, 5, 10, 11 Are Mapped

CDM Group #1 in Which Port 2, 3, 8, 9 Are Mapped

Set 0

CDM Group #0 in Which Port 0, 1, 6, 7 Are Mapped

Symbol #n     #n+1

DMRS Type 1, 1 Front
Loaded DMRS Symbol

CONFIGURATION OF RESOURCE ELEMENTS IN DEMODULATION REFERENCE SIGNALS FOR CHANNEL ESTIMATION AND DATA TRANSMISSION

CROSS-REFERENCE TO RELATED APPLICATION

This application claims the benefit of priority under 35 U.S.C. § 120 as a continuation of International Patent Application No. PCT/CN2021/121985, filed on Sep. 30, 2021, the disclosure of which is incorporated herein by reference in its entirety.

TECHNICAL FIELD

The disclosure relates generally to wireless communications, including but not limited to systems and methods for configuring resource elements (REs) in demodulation reference signals (DMRSs).

BACKGROUND

The standardization organization Third Generation Partnership Project (3GPP) is currently in the process of specifying a new Radio Interface called 5G New Radio (5G NR) as well as a Next Generation Packet Core Network (NG-CN or NGC). The 5G NR will have three main components: a 5G Access Network (5G-AN), a 5G Core Network (5GC), and a User Equipment (UE). In order to facilitate the enablement of different data services and requirements, the elements of the 5GC, also called Network Functions, have been simplified with some of them being software based so that they could be adapted according to need.

SUMMARY

The example embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, example systems, methods, devices and computer program products are disclosed herein. It is understood, however, that these embodiments are presented by way of example and are not limiting, and it will be apparent to those of ordinary skill in the art who read the present disclosure that various modifications to the disclosed embodiments can be made while remaining within the scope of this disclosure.

At least one aspect is directed to a system, a method, an apparatus, or a computer-readable medium for configuring resource elements (REs) in demodulation reference signals (DMRSs) for data transmission. A wireless communication device may receive, from a wireless communication node, a first signaling indicating whether at least one set of a plurality of sets of resource elements of at least one demodulation reference signal (DMRS) symbol, is to be used for transmission that excludes DMRS (e.g., includes data, or excludes data and/or DMRS). Each of the plurality of sets may include at least one code division multiplex (CDM) group, each of the at least one CDM group including resource elements on which corresponding DMRS ports are multiplexed.

At least one aspect is directed to a system, a method, an apparatus, or a computer-readable medium for configuring resource elements (REs) in demodulation reference signals (DMRSs) for data transmission. A wireless communication node may send, to a wireless communication device, a first signaling indicating whether at least one set of a plurality of sets of resource elements of at least one demodulation reference signal (DMRS) symbol, is to be used for transmission that excludes DMRS. Each of the plurality of sets may include at least one code division multiplex (CDM) group, each of the at least one CDM group including resource elements on which corresponding DMRS ports are multiplexed.

In some embodiments, the at least one DMRS symbol may include one front-loaded DMRS symbol or two adjacent front-loaded DMRS symbols. In some embodiments, indicating whether the at least one set is to be used for transmission that excludes DMRS may include indicating whether the at least one set is to be used for transmission of data instead of DMRS or for transmission that excludes data or DMRS.

In some embodiments, the plurality of sets may include a first set that comprises resource elements of indices 0-5, and a second set that comprises resource elements of indices 6-11. In some embodiments, the first signaling may include downlink control information, and may indicate whether the at least one set is to be used for transmission that excludes DMRS, via a DMRS port indication field or another field in the DCI In some embodiments, the wireless communication device may determine that a DMRS pattern of a defined format is enabled semi-statically, and that DMRS ports of the wireless communication device are mapped on a CDM group of index 0 in a first set of the plurality of sets. In some embodiments, the wireless communication device may determine that remaining sets of the plurality of sets are for transmission of data.

In some embodiments, the at least one CDM group may include at least one of: a first CDM group in which DMRS ports 0 and 1 map on resource elements of indices 0 and 1, a second CDM group in which DMRS ports 2 and 3 map on resource elements of indices 2 and 3, or, a third CDM group in which DMRS ports 4 and 5 map on resource elements of indices 4 and 5, a fourth CDM group in which DMRS ports 12 and 13 map on resource elements of indices 6 and 7, a fifth CDM group in which DMRS ports 14 and 15 map on resource elements of indices 8 and 9, or a sixth CDM group in which DMRS ports 16 and 17 map on resource elements of indices 10 and 11.

In some embodiments, the at least one CDM group includes at least one of: a first CDM group in which DMRS ports 0, 1, 6 and 7 map on resource elements of indices 0 and 1, a second CDM group in which DMRS ports 2, 3, 8 and 9 map on resource elements of indices 2 and 3, a third CDM group in which DMRS ports 4, 5, 10 and 11 map on resource elements of indices 4 and 5, a fourth CDM group in which DMRS ports 12, 13, 18 and 19 map on resource elements of indices 6 and 7, a fifth CDM group in which DMRS ports 14, 15, 20 and 21 map on resource elements of indices 8 and 9, or a sixth CDM group in which DMRS ports 16, 17, 22 and 23 map on resource elements of indices 10 and 11.

In some embodiments, DMRS ports of the wireless communication device may be mapped to resource elements of a first set of the plurality of sets. In some embodiments, downlink control information (DCI) from the wireless communication node may include a DMRS port indication field that indicates at least one of: number of DMRS symbols that are front-loaded, or a CDM group within the first set that is not for transmission of data. In some embodiments, the DCI may indicate at least one of: which of the plurality of sets is to be used for transmission of DMRS, or whether a remaining set of the plurality of sets is to be used for the transmission of data.

In some embodiments, if the DCI indicates that an N-th set of the plurality of sets is to be used for the transmission of DMRS, the wireless communication device may determine that the one or more sets preceding the N-th set are to be used for transmission that excludes data In some embodiments, the wireless communication node may configure a DMRS pattern of a defined format semi-statically, and that DMRS ports of the wireless communication device are mapped on a CDM group of index 0 in a first set of the plurality of sets. In some embodiments, the wireless communication node may predefine or indicate that remaining sets of the plurality of sets are for transmission of data. In some embodiments, the DMRS port indication field may indicate whether at least one CDM group in the N-th set is to be used for transmission that excludes data.

BRIEF DESCRIPTION OF THE DRAWINGS

Various example embodiments of the present solution are described in detail below with reference to the following figures or drawings. The drawings are provided for purposes of illustration only and merely depict example embodiments of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 5A illustrates a block diagram of a demodulation reference signal (DMRS) type 2, with one front loaded DMRS symbol and two DMRS REs per port per symbol with code division multiplexing (CDM) groups and data transmissions in accordance with an illustrative embodiment;

DETAILED DESCRIPTION

Various example embodiments of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example embodiments and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

1. Mobile Communication Technology and Environment

Figure 1:
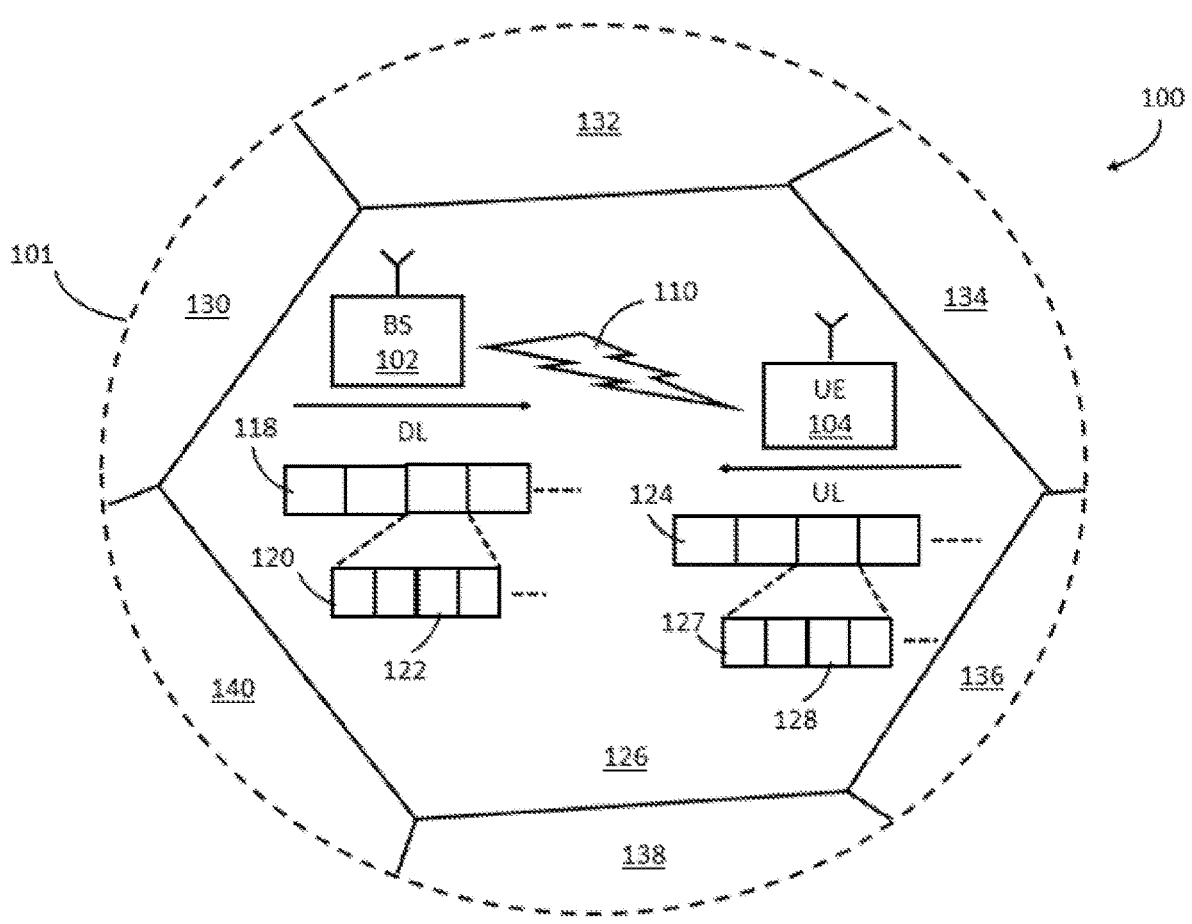
FIG. 1 illustrates an example cellular communication network in which techniques disclosed herein may be implemented, in accordance with an embodiment of the present disclosure.

FIG. 1 illustrates an example wireless communication network, and/or system, 100 in which techniques disclosed herein may be implemented, in accordance with an embodiment of the present disclosure. In the following discussion, the wireless communication network 100 may be any wireless network, such as a cellular network or a narrowband Internet of things (NB-IoT) network, and is herein referred to as "network 100." Such an example network 100 includes a base station 102 (hereinafter "BS 102"; also referred to as wireless communication node) and a user equipment device 104 (hereinafter "UE 104"; also referred to as wireless communication device) that can communicate with each other via a communication link 110 (e.g., a wireless communication channel), and a cluster of cells 126, 130, 132, 134, 136, 138 and 140 overlaying a geographical area 101. In FIG. 1, the BS 102 and UE 104 are contained within a respective geographic boundary of cell 126. Each of the other cells 130, 132, 134, 136, 138 and 140 may include at least one base station operating at its allocated bandwidth to provide adequate radio coverage to its intended users.

For example, the BS 102 may operate at an allocated channel transmission bandwidth to provide adequate coverage to the UE 104. The BS 102 and the UE 104 may communicate via a downlink radio frame 118, and an uplink radio frame 124 respectively. Each radio frame 118/124 may be further divided into sub-frames 120/127 which may include data symbols 122/128. In the present disclosure, the BS 102 and UE 104 are described herein as non-limiting examples of "communication nodes," generally, which can practice the methods disclosed herein. Such communication nodes may be capable of wireless and/or wired communications, in accordance with various embodiments of the present solution.

Figure 2:
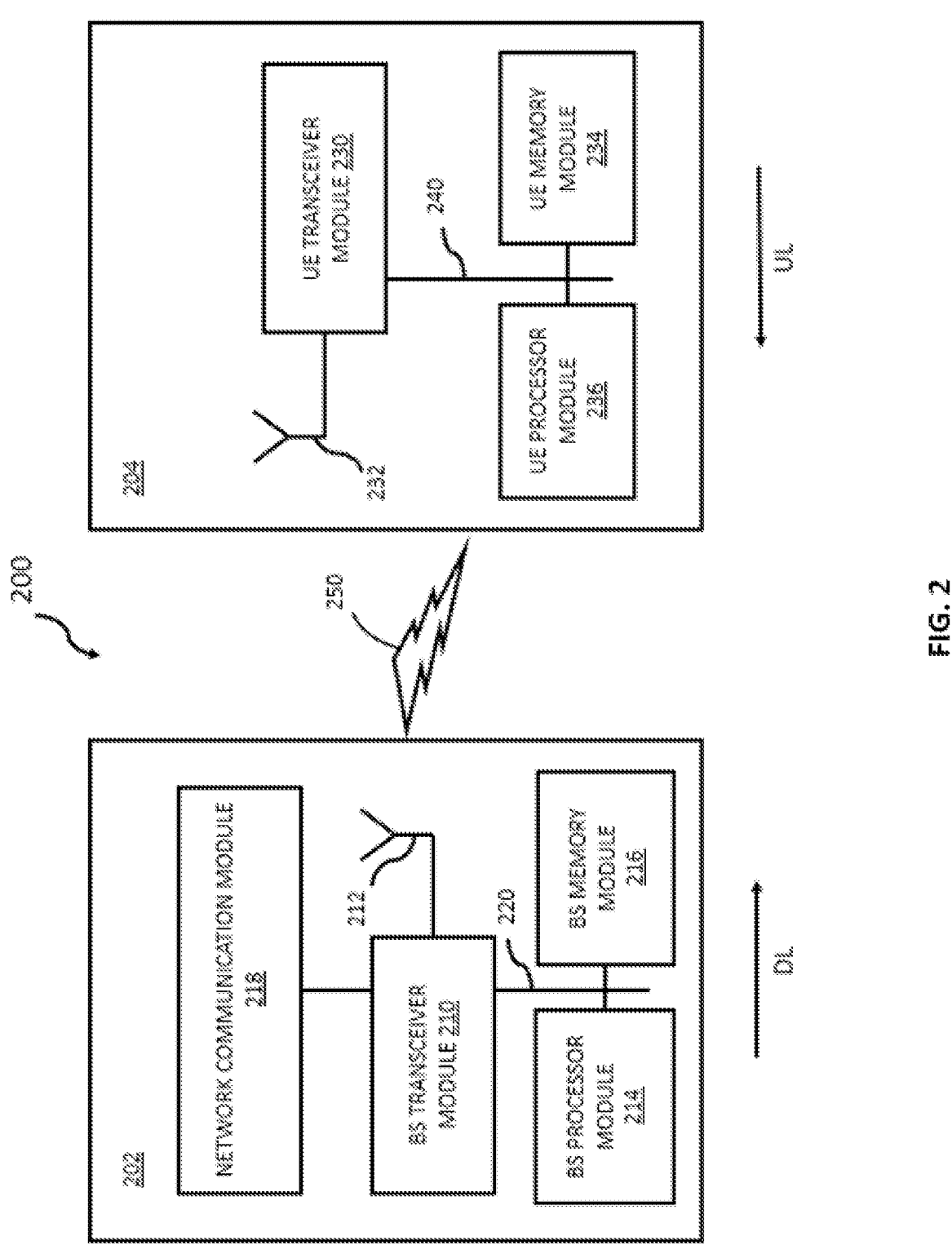
FIG. 2 illustrates a block diagram of an example base station and a user equipment device, in accordance with some embodiments of the present disclosure.

FIG. 2 illustrates a block diagram of an example wireless communication system 200 for transmitting and receiving wireless communication signals (e.g., OFDM/OFDMA signals) in accordance with some embodiments of the present solution. The system 200 may include components and elements configured to support known or conventional operating features that need not be described in detail herein. In one illustrative embodiment, system 200 can be used to communicate (e.g., transmit and receive) data symbols in a wireless communication environment such as the wireless communication environment 100 of FIG. 1, as described above.

System 200 generally includes a base station 202 (hereinafter "BS 202") and a user equipment device 204 (hereinafter "UE 204"). The BS 202 includes a BS (base station) transceiver module 210, a BS antenna 212, a BS processor module 214, a BS memory module 216, and a network communication module 218, each module being coupled and interconnected with one another as necessary via a data communication bus 220. The UE 204 includes a UE (user equipment) transceiver module 230, a UE antenna 232, a UE memory module 234, and a UE processor module 236, each module being coupled and interconnected with one another as necessary via a data communication bus 240. The BS 202 communicates with the UE 204 via a communication channel 250, which can be any wireless channel or other medium suitable for transmission of data as described herein.

As would be understood by persons of ordinary skill in the art, system 200 may further include any number of modules other than the modules shown in FIG. 2. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. Those familiar with the concepts described herein may implement such functionality in a suitable manner for each particular application, but such implementation decisions should not be interpreted as limiting the scope of the present disclosure In accordance with some embodiments, the UE transceiver 230 may be referred to herein as an "uplink" transceiver 230 that includes a radio frequency (RF) transmitter and a RF receiver each comprising circuitry that is coupled to the antenna 232. A duplex switch (not shown) may alternatively couple the uplink transmitter or receiver to the uplink antenna in time duplex fashion. Similarly, in accordance with some embodiments, the BS transceiver 210 may be referred to herein as a "downlink" transceiver 210 that includes a RF transmitter and a RF receiver each comprising circuitry that is coupled to the antenna 212. A downlink duplex switch may alternatively couple the downlink transmitter or receiver to the downlink antenna 212 in time duplex fashion. The operations of the two transceiver modules 210 and 230 may be coordinated in time such that the uplink receiver circuitry is coupled to the uplink antenna 232 for reception of transmissions over the wireless transmission link 250 at the same time that the downlink transmitter is coupled to the downlink antenna 212. Conversely, the operations of the two transceivers 210 and 230 may be coordinated in time such that the downlink receiver is coupled to the downlink antenna 212 for reception of transmissions over the wireless transmission link 250 at the same time that the uplink transmitter is coupled to the uplink antenna 232. In some embodiments, there is close time synchronization with a minimal guard time between changes in duplex direction.

The UE transceiver 230 and the base station transceiver 210 are configured to communicate via the wireless data communication link 250, and cooperate with a suitably configured RF antenna arrangement 212/232 that can support a particular wireless communication protocol and modulation scheme. In some illustrative embodiments, the UE transceiver 210 and the base station transceiver 210 are configured to support industry standards such as the Long Term Evolution (LTE) and emerging 5G standards, and the like. It is understood, however, that the present disclosure is not necessarily limited in application to a particular standard and associated protocols. Rather, the UE transceiver 230 and the base station transceiver 210 may be configured to support alternate, or additional, wireless data communication protocols, including future standards or variations thereof.

In accordance with various embodiments, the BS 202 may be an evolved node B (eNB), a serving eNB, a target eNB, a femto station, or a pico station, for example. In some embodiments, the UE 204 may be embodied in various types of user devices such as a mobile phone, a smart phone, a personal digital assistant (PDA), tablet, laptop computer, wearable computing device, etc. The processor modules 214 and 236 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the steps of a method or algorithm described in connection with the embodiments disclosed herein may be embodied directly in hardware, in firmware, in a software module executed by processor modules 214 and 236, respectively, or in any practical combination thereof. The memory modules 216 and 234 may be realized as RAM memory, flash memory, ROM memory, EPROM memory, EEPROM memory, registers, a hard disk, a removable disk, a CD-ROM, or any other form of storage medium known in the art. In this regard, memory modules 216 and 234 may be coupled to the processor modules 210 and 230, respectively, such that the processors modules 210 and 230 can read information from, and write information to, memory modules 216 and 234, respectively. The memory modules 216 and 234 may also be integrated into their respective processor modules 210 and 230. In some embodiments, the memory modules 216 and 234 may each include a cache memory for storing temporary variables or other intermediate information during execution of instructions to be executed by processor modules 210 and 230, respectively. Memory modules 216 and 234 may also each include non-volatile memory for storing instructions to be executed by the processor modules 210 and 230, respectively.

The network communication module 218 generally represents the hardware, software, firmware, processing logic, and/or other components of the base station 202 that enable bi-directional communication between base station transceiver 210 and other network components and communication nodes configured to communication with the base station 202. For example, network communication module 218 may be configured to support internet or WiMAX traffic. In a typical deployment, without limitation, network communication module 218 provides an 802.3 Ethernet interface such that base station transceiver 210 can communicate with a conventional Ethernet based computer network. In this manner, the network communication module 218 may include a physical interface for connection to the computer network (e.g., Mobile Switching Center (MSC)). The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

The Open Systems Interconnection (OSI) Model (referred to herein as, "open system interconnection model") is a conceptual and logical layout that defines network communication used by systems (e.g., wireless communication device, wireless communication node) open to interconnection and communication with other systems. The model is broken into seven subcomponents, or layers, each of which represents a conceptual collection of services provided to the layers above and below it. The OSI Model also defines a logical network and effectively describes computer packet transfer by using different layer protocols. The OSI Model may also be referred to as the seven-layer OSI Model or the seven-layer model. In some embodiments, a first layer may be a physical layer. In some embodiments, a second layer may be a Medium Access Control (MAC) layer. In some embodiments, a third layer may be a Radio Link Control (RLC) layer. In some embodiments, a fourth layer may be a Packet Data Convergence Protocol (PDCP) layer. In some embodiments, a fifth layer may be a Radio Resource Control (RRC) layer. In some embodiments, a sixth layer may be a Non Access Stratum (NAS) layer or an Internet Protocol (IP) layer, and the seventh layer being the other layer.

Figure 3:
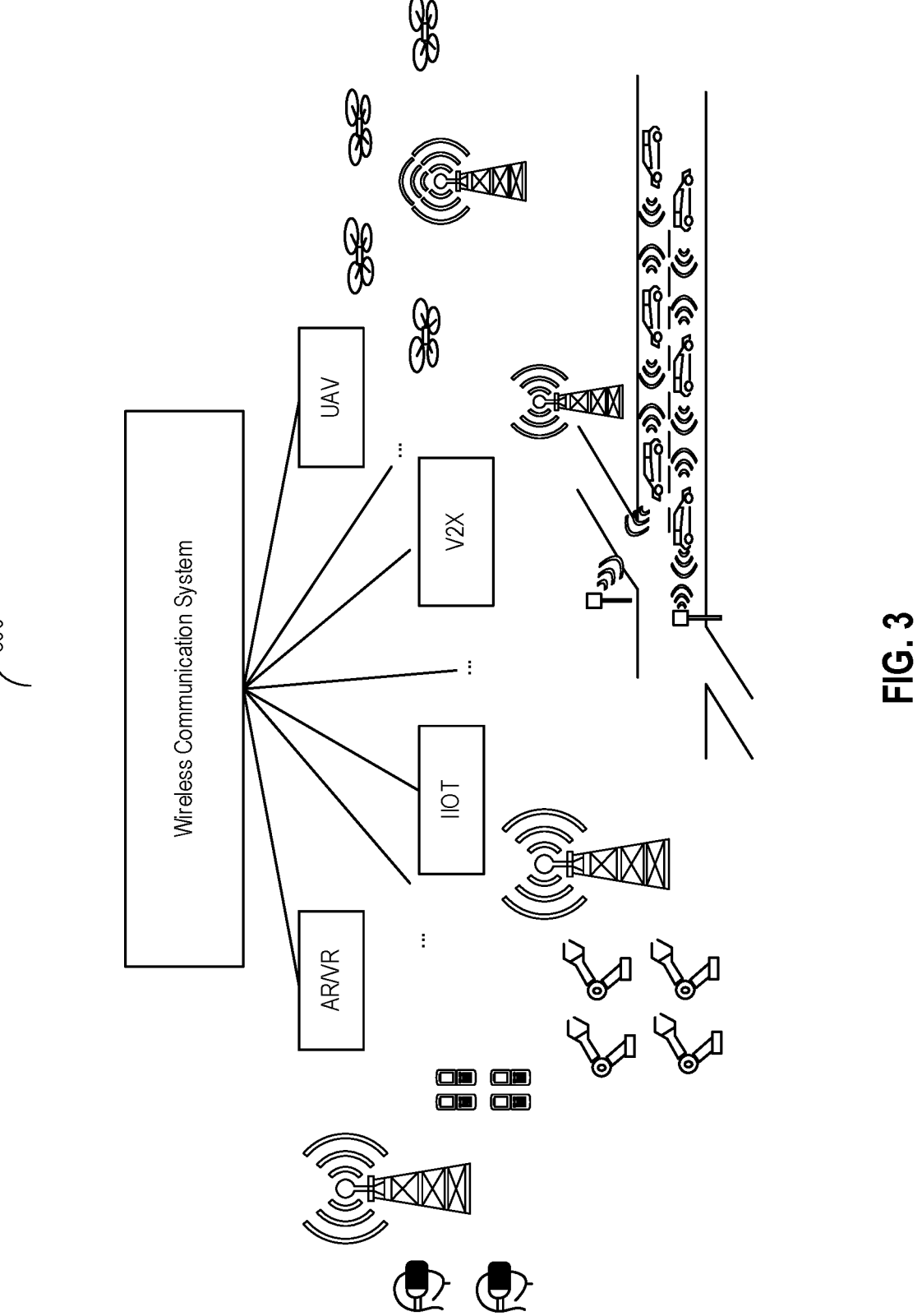
FIG. 3 illustrates a block diagram of an example wireless communication system applying artificial intelligence (AI) in accordance with an illustrative embodiment.

2. Systems and Methods for Configuration of Resource Elements in Demodulation Reference Signals Referring now to FIG. 3, depicted is a block diagram of an environment 300 for a wireless communication system applying artificial intelligence. Artificial intelligence (AI) and machine learning (ML) may be incorporated in communication networks (e.g., 5G), and may be used in reducing an overhead in resource elements (REs) for channel estimation. Using an AI-based channel estimation solutions, a small number of demodulation reference signals (DMRSs) REs may be provided in certain slots. In such communication networks, there may be two DMRS types supported, such as DMRS type 1 and DMRS type 2. Such AI-based approaches may be applied to DMR type 2. As a result, more DMRS REs can be used for data transmission instead and the system transmission capacity may be increased. To this end, some new DMRS patterns and related signaling or mechanisms may be leveraged.

Figure 4A:
FIG. 4A illustrates a block diagram of a demodulation reference signal (DMRS) type 2, with one front loaded DMRS symbol and four DMRS REs per port per symbol in accordance with an illustrative embodiment.
Figure 4A:
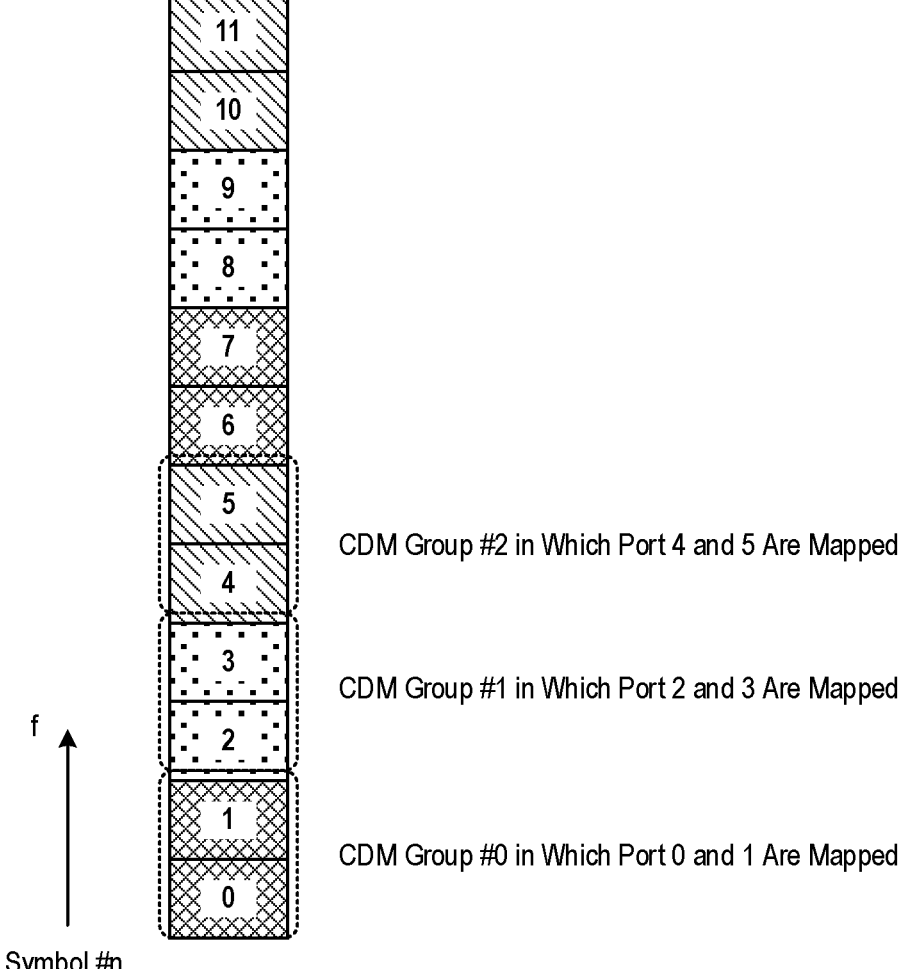

Referring now to FIG. 4A, depicted is a block diagram of a DMRS 400 of type 2, with one front loaded DMRS symbol and four DMRS REs per port per symbol. As shown, the DMRS pattern for DMRS type 2 within one PRB, in the case when one front loaded DMRS symbol may be configured by RRC signaling or indicated by DCI signaling. Two adjacent frequency REs may form one DMRS code division multiplexing (CDM) group. Specifically, DMRS ports 0 and 1 may be multiplexed in CDM group #0. For example, port 0 and port1 may be multiplexed in RE #0 and RE #1 in CDM manner, and port 0 and port 1 may also be multiplexed in RE #6 and RE #7 in CDM manner. Thus, CDM group #0 may be repeated twice, in which one may be in RE #0 and #1 and the other one may be in RE #6 and #7. Similar mapping may be used for other DMRS ports. In summary, 6 DMRS ports may be supported in the case of one front loaded DMRS symbol, and the density of each DMRS port may be 4 REs per PRB per symbol.

Figure 4B:
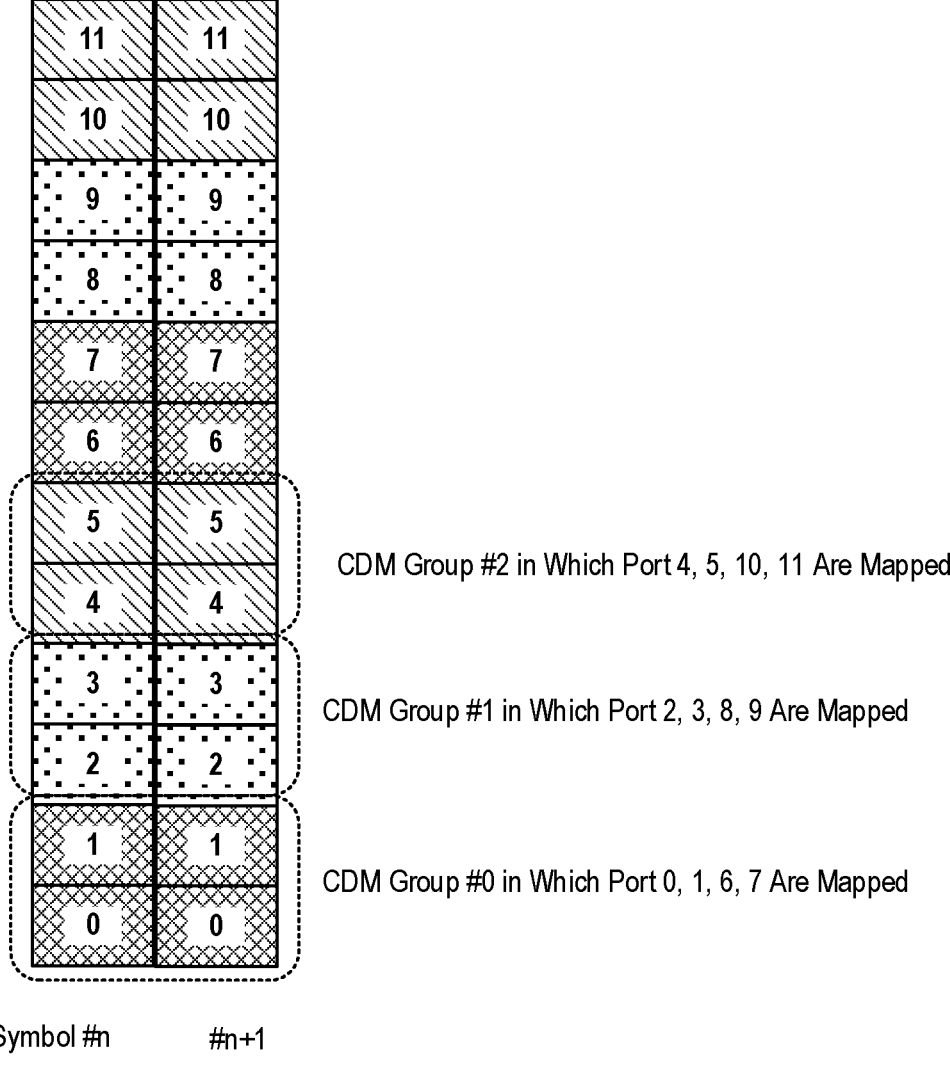
FIG. 4B illustrates a block diagram of a demodulation reference signal (DMRS) type 2, with two front loaded DMRS symbols and four DMRS REs per port per symbol in accordance with an illustrative embodiment.
Figure 4C:
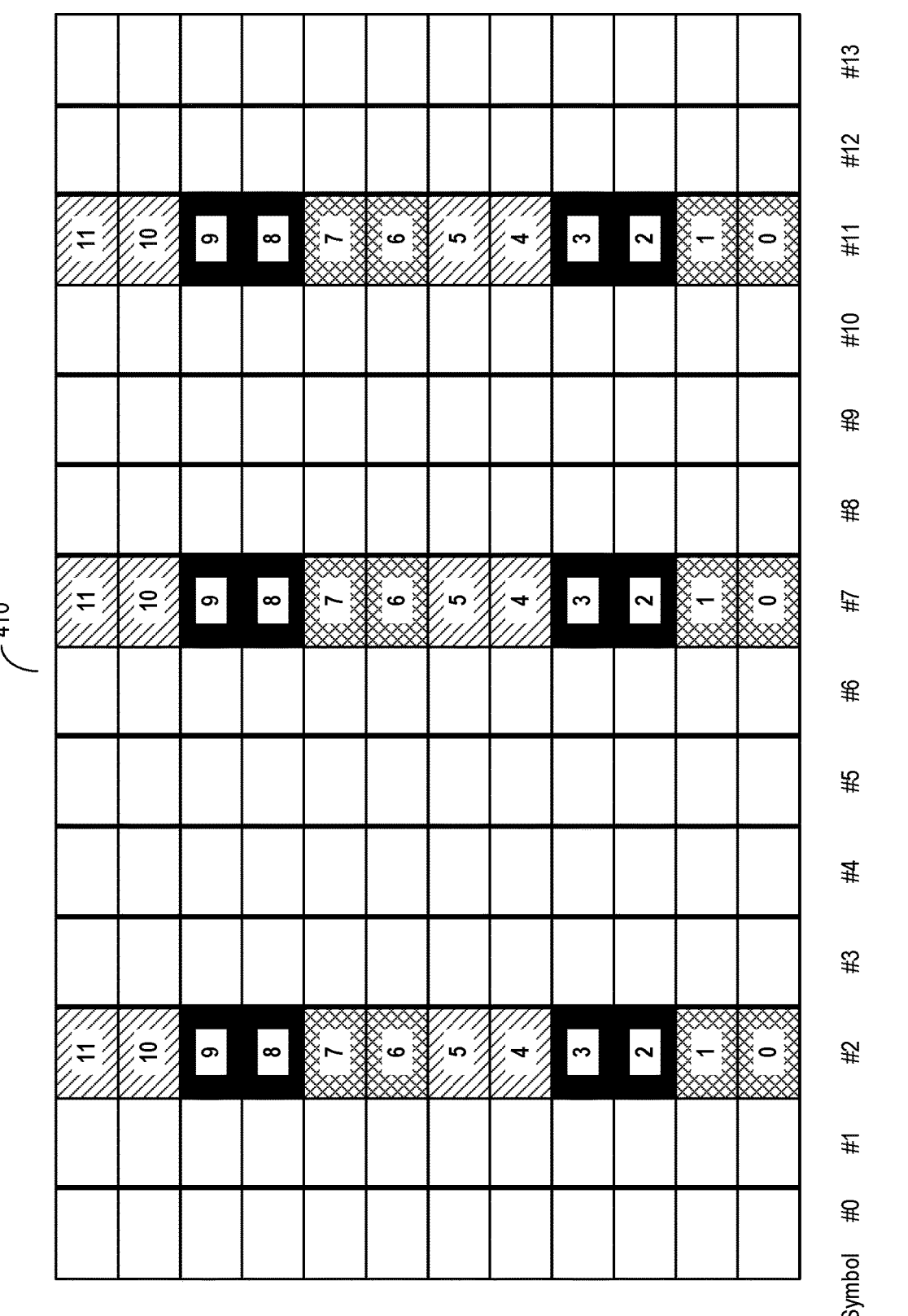
FIG. 4C illustrates a block diagram of a demodulation reference signal (DMRS) type 2, with one front loaded DMRS symbol and two additional DMRS symbols in accordance with an illustrative embodiment.

Referring now to FIG. 4B, depicted is a block diagram of a DMRS 405 of type 2, with two front loaded DMRS symbols and four DMRS REs per port per symbol. As shown, the DMRS pattern for DMRS type 2 within one PRB in the case when two front loaded DMRS symbols may be configured by radio resource control (RRC) signaling or indicated by DCI signaling. Four adjacent REs may form one DMRS CDM group. Specifically, DMRS port 0, 1, 6 and 7 may be multiplexed in CDM group #0 in CDM manner. Similar mapping may be used for other DMRS ports. In summary, 12 DMRS ports may be supported in the case of two front loaded DMRS symbols, and the density of each DMRS port may be 8 REs per PRB per 2-symbols. In one PRB, each CDM group may be mapped twice. For example, CDM group #0 may be mapped on RE #0, #1 and also RE #6, #7. Referring briefly to FIG. 4C, depicted is a block diagram of a DMRS 410 of type 2, with one front loaded DMRS symbol and two additional DMRS symbols. In one slot, one front loaded DMRS symbol and X=0, 1, 2 additional DMRS symbol can be configured.

A. Saving Overhead in Demodulation Reference Signals (DMRS) for Data Transmission When AI is applied to DMRS channel estimation, the amount of DMRS overhead can be reduced and the corresponding REs can be used for data transmission as satisfactory DMRS channel estimation results can be achieved with less DMRS overhead.

One approach may be to reduce DMRS overhead in the frequency domain. Specifically, DMRS may be transmitted per M>1 physical resource block (PRB) (e.g., M=2). DMRS may be transmitted in even PRBs within scheduled PDSCH or PUSCH resources. There may not be DMRS in odd PRBs, and the REs on which DMRS originally maps in odd PRBs may be used for data (e.g., physical data shared channel (PDSCH) or physical uplink shared channel (PUSCH)) transmission. However, this approach may not be reliable in the scenarios with multiple-path channel condition in which large channel variation exists in frequency domain. To address these issues, another approach may be to introduce a new DMRS pattern as detailed herein.

Referring now to FIG. 5A, depicted is a block diagram of a DMRS 500 of type 2, with one front loaded DMRS symbol and two DMRS REs per port per symbol with CDM groups and data transmissions. One front loaded DMRS symbol may be configured or indicated. In the DMRS symbol in each PRB, DMRS ports 0 and 1 may be mapped on RE #0 and #1 in CDM manner. DMRS ports 2 and 3 may be mapped on RE #2 and #3 in CDM manner. DMRS ports 4 and 5 may be mapped on RE #4 and #5 in CDM manner. RE #6-11 may not be used for DMRS anymore, and may be used for PDSCH or PUSCH transmission. Alternatively, in the DMRS symbol in each PRB, DMRS port 0 and 1 may be mapped on RE #6 and #7 in CDM manner. DMRS port 2 and 3 may be mapped on RE #8 and #9 in CDM manner. DMRS port 4 and 5 may be mapped on RE #10 and #11 in CDM manner. RE #0-5 may not be used for DMRS transmission anymore, and may be instead used for PDSCH or PUSCH transmission.

Figure 5B:
FIG. 5B illustrates a block diagram of a demodulation reference signal (DMRS) type 2, with two front loaded DMRS symbols and two DMRS REs per port per symbol with code division multiplexing (CDM) groups and data transmissions in accordance with an illustrative embodiment.
Figure 5B:

Referring now to FIG. 5B, depicted is a block diagram of a DMRS 505 of type 2, with two front loaded DMRS symbols and two DMRS REs per port per symbol with code division multiplexing (CDM) groups and data transmissions. Two front loaded DMRS symbols may be configured or indicated. In the two adjacent DMRS symbols in each PRB, DMRS port 0, 1, 6, 7 may be mapped on RE #0 and #1 (one RE here refers to one subcarrier in frequency domain) in CDM manner (e.g., four ports map on 4 adjacent REs). DMRS port 2, 3, 8, 9 may be mapped on RE #2 and #3 in CDM manner. DMRS port 4, 5, 10, 11 may be mapped on RE #4 and #5 in CDM manner. RE #6-11 may not be used for DMRS anymore, and may instead be used for PDSCH or PUSCH transmission (e.g., data transmission) for example. Alternatively, in the two adjacent DMRS symbols in each PRB, DMRS port 0, 1, 6, 7 may be mapped on RE #6 and #7 in CDM manner (e.g., four ports map on 4 adjacent REs). DMRS port 2, 3, 8, 9 may be mapped on RE #8 and #9 in CDM manner. DMRS port 4, 5, 10, 11 may be mapped on RE #10 and #11 in CDM manner. RE #0-5 may not be used for DMRS, and may instead be used for PDSCH or PUSCH transmission.

Based on the above new DMRS pattern, the maximum number of DMRS ports may be the same as existing ones. The benefit may be in less DMRS overhead and more resources available for data. However, some UEs may be legacy ones or unable to use the new DMRS pattern, while other UEs may be new ones capable of using the new DMRS pattern. If multiple UEs are scheduled in the same time-frequency resources (e.g., multi-user scheduling) with legacy and new UEs, the data REs of new UEs with new DMRS pattern and some DMRS REs of legacy UEs with legacy DMRS pattern may overlap. The serious interference may be caused to legacy DMRS channel estimation. For example, one legacy UE and one new UE may use DMRS patterns. New UE transmitting data on RE #6-11 may cause severe interference on legacy DMRS REs #6-11 as data and DMRS are not orthogonal.

In some embodiments, whether the DMRS pattern is new or legacy (e.g., of a first or second version/type/format) may be dynamically indicated by DCI. To this end, one bit may be introduced to indicate the DMRS pattern in front loaded DMRS symbol(s) is legacy one or new one. If all co-scheduled UEs are new, then the gNB can indicate the new UE to use the new DMRS pattern for efficient transmission. In such case, all co-scheduled UEs may be indicated with new DMRS patterns. If at least one co-scheduled UEs are legacy, gNB may indicate the new UE to use legacy DMRS pattern in order to avoid interference to legacy UE's DMRS. This approach may be simple from signaling perspective. However, the new UE may always maintain two DMRS estimation solutions where one is the same as legacy one and the other is using AI based channel estimation with less DMRS overhead while keeping high channel estimation reliability.

In some embodiments, REs or existing CDM group REs may be divided in DMRS symbol(s) within one PRB into N>1 sets and downlink control information (DCI) may be used to indicate at least a subset of N sets are mapped with data or without data. To this end, 1 bit may be introduced to indicate whether at least a subset of N sets are mapped with data or without data. For example, N=2 as shown in FIG. 5A, RE #0-5 may belong to first set and RE #6-11 may belong to second set. 1 bit in DCI may be to indicate that the second set (RE #6-11) is mapped with data or without data. If mapped without data, gNB or UE may neither transmit data nor DMRS on RE #6-11. In contrast, if mapped with data, gNB or UE may transmit data on these REs. In such case, the receiver side may only maintain AI based channel estimation pattern. The complexity may be in dynamically performing rate matching in the second RE set, as one more DCI bit is used.

To save DCI overhead and reduce UE complexity, a DMRS port indication bit/field (e.g., antenna field in DCI) may be used to dynamically indicate that at least a subset of N sets are mapped with data or without data. Moreover, it can be predefined that the DMRS ports of legacy UE(s) with legacy DMRS pattern are mapped on the first N1 DMRS CDM group(s) if any, and DMRS ports of new UE(s) with new DMRS pattern are mapped on the remaining DMRS CDM group(s). For a new UE configured with new DMRS pattern, if it is indicated that the DMRS port(s) map on CDM group index=0, the actual or whole pattern to be used may be the new DMRS pattern. This may be because if it is indicated with DMRS ports mapping on the first CDM group (e.g., CDM group 0), that indication may imply that all co-scheduled UEs are new UEs with new DMRS pattern. As such, the second RE set may be used with data transmission.

Furthermore, if it is indicated that the DMRS port(s) map on CDM group index=1, whether the pattern to be used is the new DMRS pattern or legacy DMRS pattern may be dynamically indicated. This may be because if a new UE is indicated with DMRS ports mapping on the second CDM group (e.g., CDM group 1), that indication may imply that other co-scheduled UEs map on CDM group 1 and 2 when any UEs are new ones which are also indicated with new DMRS pattern. But CDM group 0 may be allocated for either a legacy UE DMRS port(s) or a new UE DMRS port(s), and may be indicated, for example, indicated by DMRS port indication. In addition, if it is indicated that DMRS port(s) map on CDM group index=2, whether the pattern to be used is the new DMRS pattern or the legacy DMRS pattern may be also dynamically indicated. For DMRS type 1, there may be no CDM group index 2.

B. Increasing the Number of Code Division Multiplexing (CDM) Groups in Demodulation Reference Signals (DMRS)

11

To further increase system capacity, the maximum number of DMRS ports can be increased (e.g., doubled), and the maximum number of CDM groups may be increased in proportion (e.g., also doubled).

Figure 6A:
FIG. 6A illustrates a block diagram of a demodulation reference signal (DMRS) type 2, with one front loaded DMRS symbol and two DMRS REs per port per symbol with code division multiplexing (CDM) groups in accordance with an illustrative embodiment.
Figure 6A:
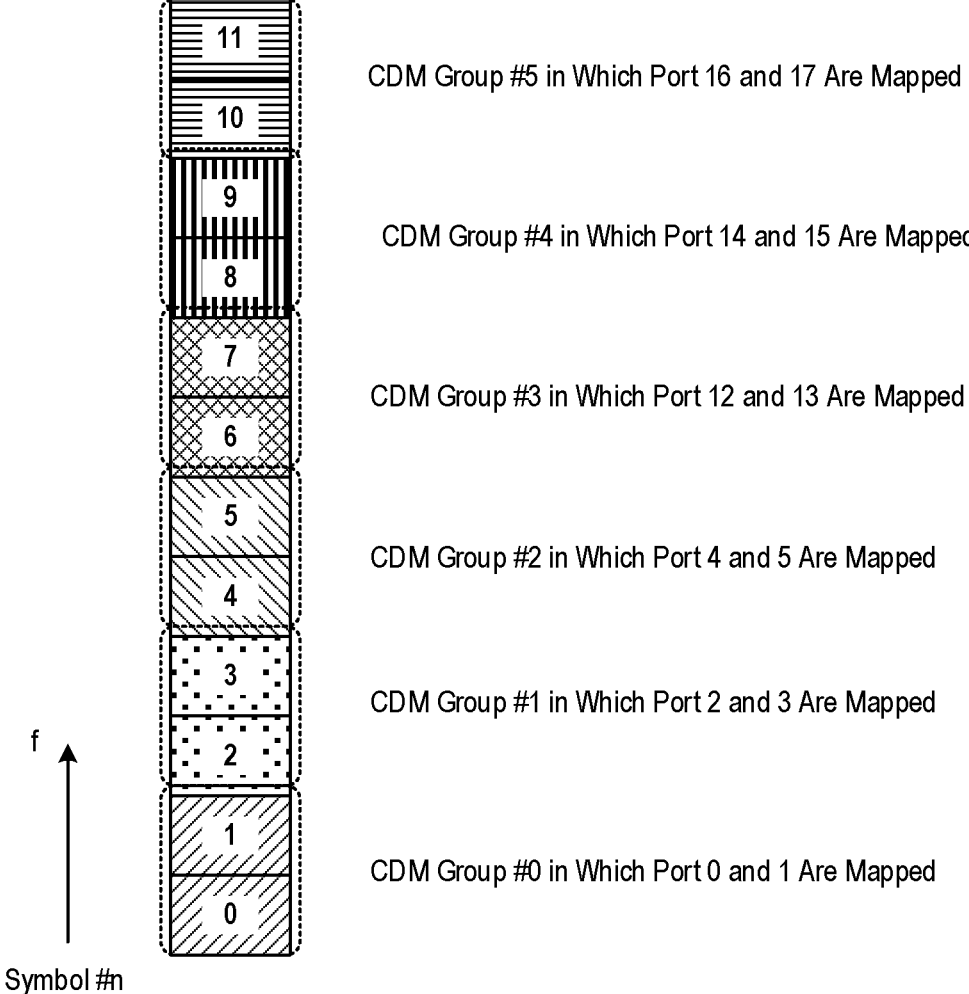

Referring now to FIG. 6A, depicted is a block diagram of a DMRS 600 of type 2, with one front loaded DMRS symbol and two DMRS REs per port per symbol with CDM groups. As depicted, one front loaded DMRS symbol may be configured or indicated. In the DMRS symbol in each PRB, DMRS port 0 and 1 may be mapped on RE #0 and #1 in CDM group 0. DMRS port 2 and 3 may be mapped on RE #2 and #3 in CDM group 1. DMRS port 4 and 5 may be mapped on RE #4 and #5 in CDM group 2. DMRS port 12 and 13 may be mapped on RE #6 and #7 in CDM group 3. DMRS port 14 and 15 may be mapped on RE #8 and #9 in CDM group 4. DMRS port 16 and 17 may be mapped on RE #10 and #11 in CDM group 5.

Figure 6B:
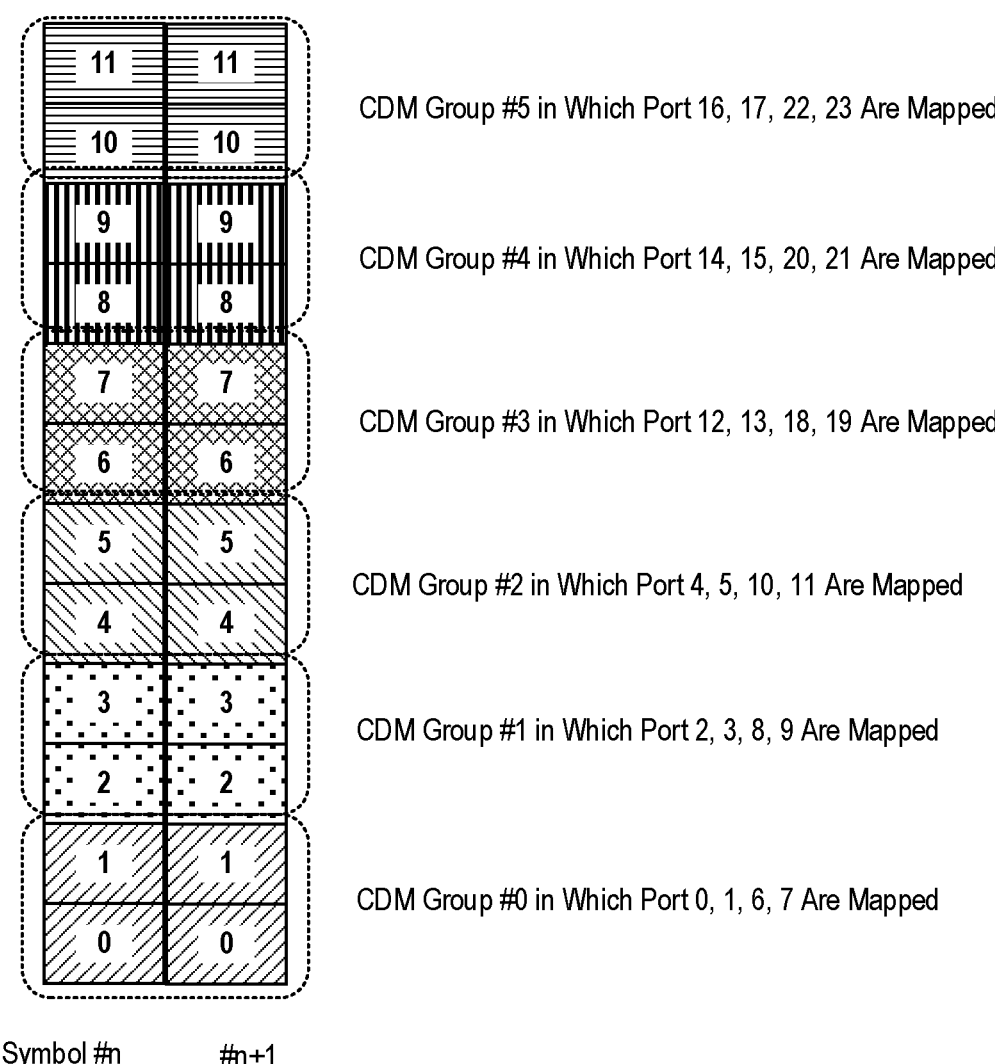
FIG. 6B illustrates a block diagram of a demodulation reference signal (DMRS) type 2, with two front loaded DMRS symbols and two DMRS REs per port per symbol with code division multiplexing (CDM) groups in accordance with an illustrative embodiment.

Referring now to FIG. 6B, depicted is a block diagram of a DMRS 605 of type 2, with two front loaded DMRS symbols and two DMRS REs per port per symbol with CDM groups. As depicted, one front loaded DMRS symbol may be configured or indicated. In the DMRS symbol in each PRB, DMRS port 0, 1, 6, 7 may be mapped on RE #0 and #1 in CDM group 0. DMRS port 2, 3, 8, 9 may be mapped on RE #2 and #3 in CDM group 1. DMRS port 4, 5, 10, 11 may be mapped on RE #4 and #5 in CDM group 2. DMRS port 12, 13, 18, 19 may be mapped on RE #6 and #7 in CDM group 3. DMRS port 14, 15, 20, 21 may be mapped on RE #8 and #9 in CDM group 4. DMRS port 16, 17, 22, 23 may be mapped on RE #10 and #11 in CDM group 5.

Based on above new patterns, a maximum of 12 and 24 DMRS ports can be supported for multiple UEs scheduling for the cases with one and two front loaded DMRS symbols respectively. For one UE, the maximum number of indicated DMRS ports may still be the same as legacy. However, this may cause complexity on how to indicate to a UE whether CDM groups other than the CDM group(s) allocated to itself are mapped with data or without data. Also, the existing DMRS indication table may be redesigned or reconfigured, leading to more effort spent in the specification of the table.

Figure 7A:
FIG. 7A illustrates a block diagram of a demodulation reference signal (DMRS) type 2, with one front loaded DMRS symbol and two DMRS REs per port per symbol with code division multiplexing (CDM) groups arranged in two sets in accordance with an illustrative embodiment.
Figure 7A:
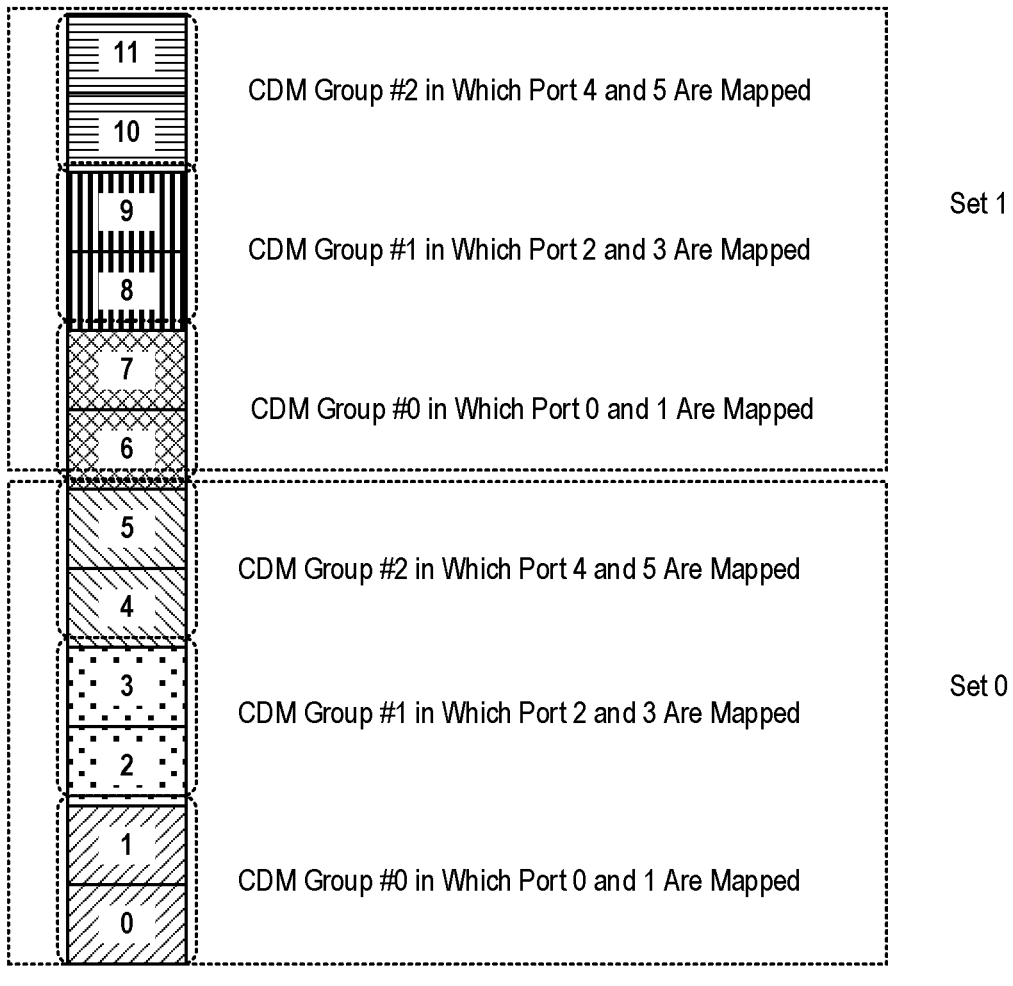
Figure 7B:
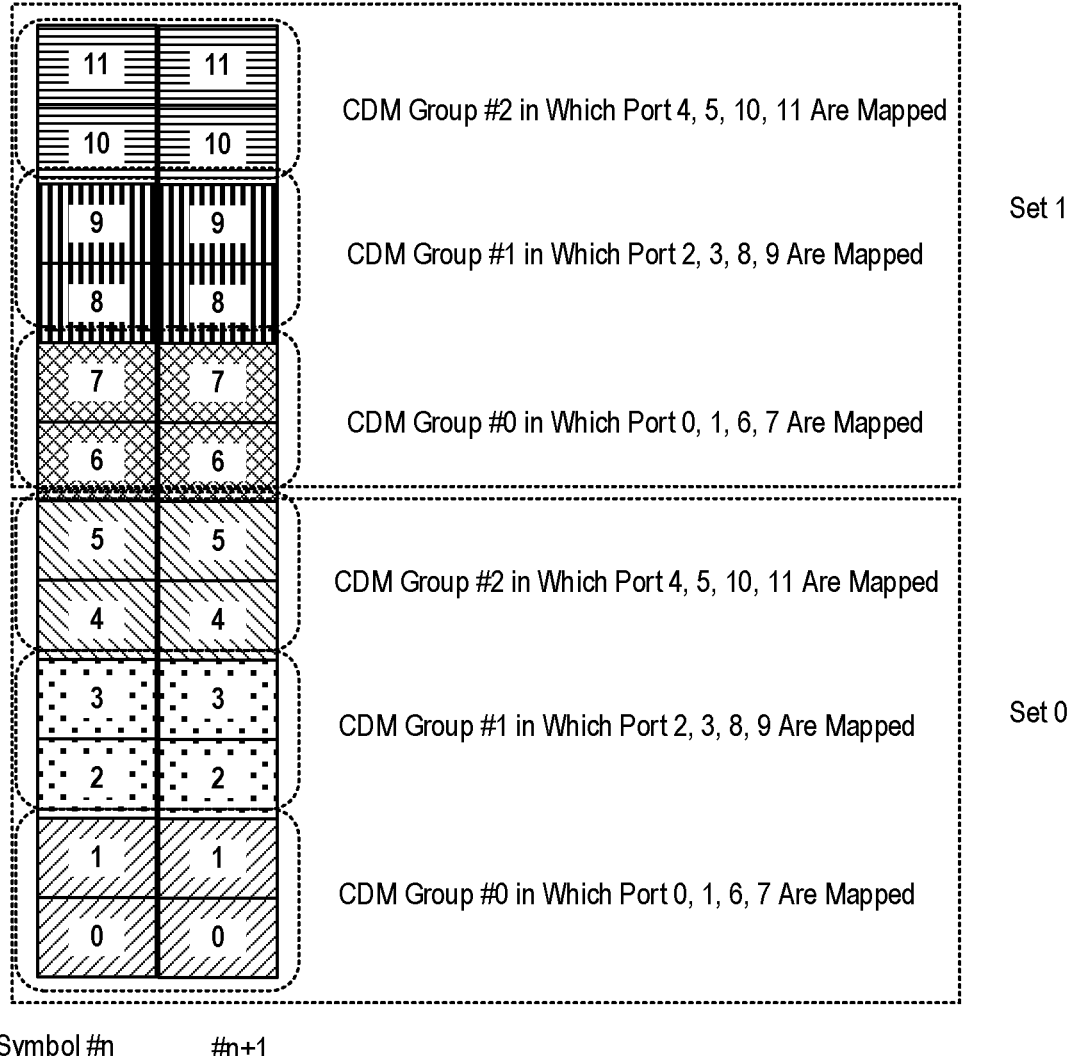
FIG. 7B illustrates a block diagram of a demodulation reference signal (DMRS) type 2, with two front loaded DMRS symbols and two DMRS REs per port per symbol with code division multiplexing (CDM) groups arranged in two sets in accordance with an illustrative embodiment.

Referring to FIG. 7A, depicted is a block diagram of a DMRS 700 of type 2, with one front loaded DMRS symbol and two DMRS REs per port per symbol with CDM groups arranged in two sets. Referring to FIG. 7B, depicted is a block diagram of a DMRS 705 of type 2, with two front loaded DMRS symbols and two DMRS REs per port per symbol with CDM groups arranged in two sets. In some embodiments, all the CDM groups or DMBS ports may be divided into N sets (e.g., N=2). The maximum number of DMRS ports is N times of legacy approaches as with DMRS 700 and 705.

For a new UE, the DMRS ports of the UE may be restricted within one set. The existing DMRS port indication field in DCI may be used to indicate DMRS port information within a set including the number of front loaded DMRS symbols and CDM group without data, among others. Meanwhile, another DCI field may be used to indicate the UE set information including which set is to be used for its DMRS port(s) transmission and whether the remaining set is used with data or without data.

The new DCI field can be 2 bits for DMRS type 2 as shown below in Table 1. Set index corresponding to DMRS port indication field may be used to indicate which set is to be used for the DMRS port transmission of the UE. And the last column refers to whether the other/remaining set is used for data or not. The existing DMRS port indication field in DCI may be used to indicate the UE's DMRS port information within the set, which is indicated by the set index in the second column in the table below.

TABLE 1

| | Set information indication field | |
| --- | --- | --- |
| Value | Set index corresponding to DMRS port indication | Whether the other set is used for data |
| 0 | 0 | Set 1 with data |
| 1 | 0 | Set 1 without data |
| 2 | 1 | Set 0 with data |
| 3 | 1 | Set 0 without data |

To further reduce complexity, the allocation of sets for multiple UEs may be predefined in ascending order. The set with lower index may be allocated to UEs first. For a UE, if the set index corresponding to DMRS port indication field is x, the UE can assume set(s) with lower set index than x has been allocated to other UEs' DMRS. As such, the set(s) with lower set index than x may not be used for data for this UE without extra signaling indication. Otherwise, if the UE transmits data on these lower index set(s), there may be severe interference to other UEs DMRS.

For example, for DMRS type 2, if a UE #1 is indicated with set 1, the UE's DMRS may be within set 1, and set 0 may not be used for data transmission by the UE. Thus, the Table 1 can be simplified as Table 2.

TABLE 2

| | Set information indication field | |
| --- | --- | --- |
| Value | Set index corresponding to DMRS port indication | Whether the other set is used for data |
| 0 | 0 | Set 1 with data |
| 1 | 0 | Set 1 without data |
| 2 | 1 | Set 0 without data |

Within the set on which the DMRS (or DMRS ports) of the UE are mapped, some CDM groups within the set can be without data or with data, depending on the DMRS port indication field.

For a UE, if the set index corresponding to DMRS port indication field is x, the UE can assume set(s) with larger set index than x has been allocated to DMRS of other UE(s). As such, the set(s) with larger set index than x may not be used for data for this UE. Although the maximum number of DMRS ports within each set is the same as legacy, the total number of DMRS ports may be N times than legacy. The system capacity can be improved because more UEs can be co-scheduled together.

C. Dividing Demodulation Reference Signals (DMRS) by Resource Elements or Subcarriers For DMRS type 1, two CDM groups may be supported where CDM group 0 comprises of even REs and CDM group 1 comprises odd REs or subcarriers. All REs or CDM groups in DMRS symbol(s) can be divided into N>1 RE sets (e.g., N=3). Maximum number of DMRS ports may be N times of legacy ones in which maximum 4 and 8 ports are supported in the case of 1 and 2-front loaded DMRS symbols.

Figure 8A:
FIG. 8A illustrates a block diagram of a demodulation reference signal (DMRS) type 1, with one front loaded DMRS symbol divided into three sets in accordance with an illustrative embodiment.
Figure 8A:
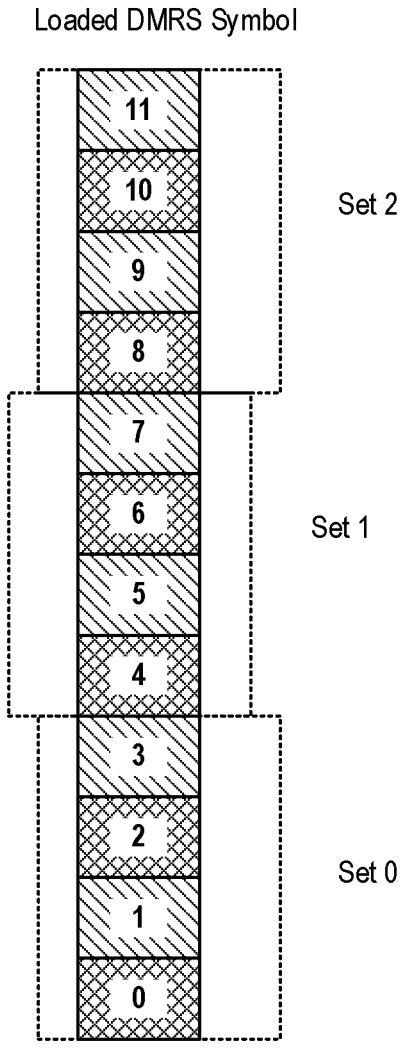

Referring now to FIG. 8A, depicted is a block diagram of a DMRS 800 of type 1, with one front loaded DMRS symbol divided into three sets. For example, as depicted, DMRS port {0, 1} may be mapped on RE or subcarrier {0, 2} in CDM manner in RE set 0. DMRS port {2, 3} may be mapped on RE or subcarrier {1, 3} in CDM manner in RE set 0. DMRS port {8, 9} may be mapped on RE or subcarrier {0, 2} in CDM manner in RE set 1. DMRS port {10, 11} may be mapped on RE or subcarrier {1, 3} in CDM manner in RE set 1. DMRS port {16, 17} may be mapped on RE or subcarrier {0, 2} in CDM manner in RE set 2. DMRS port {18, 19} may be mapped on RE or subcarrier {1, 3} in CDM manner in RE set 2.

In some embodiments, DMRS port {0, 1} may be mapped on RE or subcarrier {0, 2} in CDM manner in RE set 0. DMRS port {2, 3} may be mapped on RE or subcarrier {1, 3} in CDM manner in RE set 0. DMRS port {8, 9} may be mapped on RE or subcarrier {0, 2} in CDM manner in RE set 1. DMRS port {10, 11} may be mapped on RE or subcarrier {1, 3} in CDM manner in RE set 1. DMRS port {12, 13} may be mapped on RE or subcarrier {0, 2} in CDM manner in RE set 2. DMRS port {14, 15} may be mapped on RE or subcarrier {1, 3} in CDM manner in RE set 2.

Figure 8B:
FIG. 8B illustrates a block diagram of a demodulation reference signal (DMRS) type 1, with two front loaded DMRS symbols divided into three sets in accordance with an illustrative embodiment.
Figure 8B:
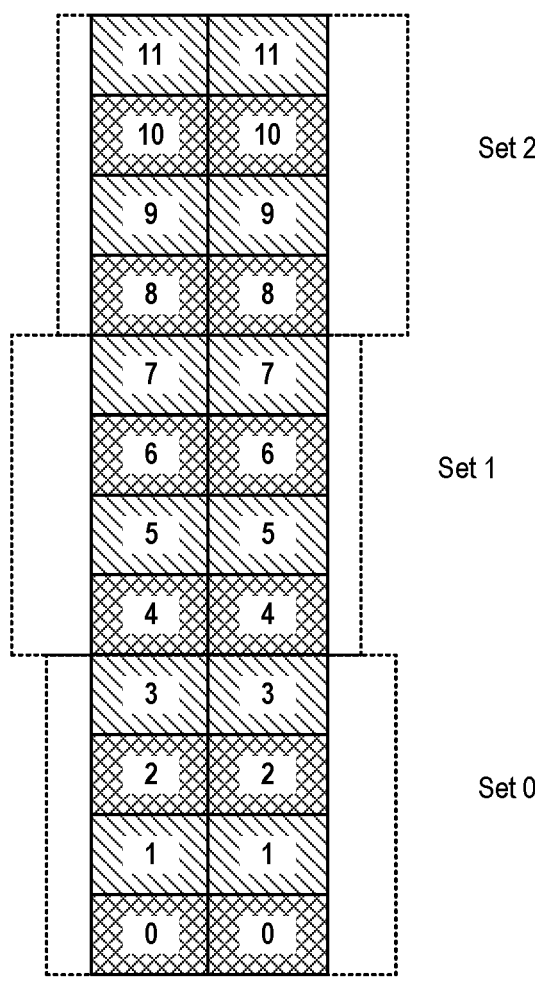

Referring now to FIG. 8B, depicted is a block diagram of a DMRS 805 of type 1, with two front loaded DMRS symbols divided into three sets. For example, as depicted, DMRS port {0, 1, 4, 5} may be mapped on RE or subcarrier {0, 2} in CDM manner in RE set 0. DMRS port {2, 3, 6, 7} may be mapped on RE or subcarrier {1, 3} in CDM manner in RE set 0. DMRS port {8, 9, 12, 13} may be mapped on RE or subcarrier {0, 2} in CDM manner in RE set 1. DMRS port {10, 11, 14, 15} may be mapped on RE or subcarrier {1, 3} in CDM manner in RE set 1. DMRS port {16, 17, 20, 21} may be mapped on RE or subcarrier {0, 2} in CDM manner in RE set 2. DMRS port {18, 19, 22, 23} may be mapped on RE or subcarrier {1, 3} in CDM manner in RE set 2.

In some embodiments, DMRS port {0, 1, 4, 5} may be mapped on RE or subcarrier {0, 2} in CDM manner in RE set 0. DMRS port {2, 3, 6, 7} may be mapped on RE or subcarrier {1, 3} in CDM manner in RE set 0. DMRS port {8, 9, 16, 17} may be mapped on RE or subcarrier {0, 2} in CDM manner in RE set 1. DMRS port {10, 11, 18, 19} may be mapped on RE or subcarrier {1, 3} in CDM manner in RE set 1. DMRS port {12, 13, 20, 21} may be mapped on RE or subcarrier {0, 2} in CDM manner in RE set 2. DMRS port {14, 15, 22, 23} may be mapped on RE or subcarrier {1, 3} in CDM manner in RE set 2.

For one new UE, DMRS ports of the new UE may be restricted within one set. The existing DMRS port indication field in DCI may be used to indicate DMRS port information within a set including the number of front loaded DMRS symbols, and CDM group without data, among others. Meanwhile, another DCI field may be used to indicate the UE set information including which set is to be used for its DMRS port(s) transmission and whether the remaining set is used with data or without data.

To further reduce complexity, the allocation of the sets for multiple UEs in ascending orders may be predefined. A set with lower index may be allocated to UEs first. For a UE, if set index corresponding to DMRS port indication field is x, the UE can assume set(s) with lower set index than x has been allocated to DMRS of the other UE. The set(s) with lower set index (or higher set index) than x may not be used for data for this UE without extra signaling indication. Otherwise, if the UE transmits data on these lower index set(s), there may be severe interference to other UEs DMRS.

For example, for DMRS type 1 as shown in Table 3, if a UE #1 is indicated with set 2, the DMRS of the UE may be within set 2, and set 0 and set 1 may not be used for its data transmission by default. However, if the UE #1 is indicated with set 1, the UE may not know whether set 2 is for data or not, and may be indicated by value 2 and 3.

TABLE 3

| | Set information indication field | |
|---|---|---|
| Value | Set index corresponding to DMRS port transmission of UE#1 | Whether the other set is used for data |
| 0 | 0 | Set 1 with data |
| 1 | 0 | Set 1 without data |
| 2 | 1 | Set 0 without data Set 2 with data |
| 3 | 1 | Set 0 without data Set 2 without data |
| 4 | 2 | Set 0 and set 1 without data |

In summary, DMRS overhead can be reduced and instead be used for data transmission as satisfactory DMRS channel estimation results can be achieved with less DMRS overhead. To facilitate this, whether the DMRS pattern is new or legacy may be dynamically indicated by DCI signaling. One approach may be to introduce 1 bit to indicate the DMRS pattern is a legacy one or a new one. In addition, REs or existing CDM group REs in DMRS symbol(s) within one PRB may be divided into N sets, and at least a subset of N sets mapped with data or without data may be dynamically indicated (e.g., by DCI).

Furthermore, the maximum number of CDM groups may be doubled. DMRS port may be restricted within one set. The existing DMRS port indication in DCI field may be used to indicate DMRS port information within a set including the number of front loaded DMRS symbols, and CDM group without data, among others. Meanwhile, another DCI field may be used to indicate the UE set information including which set is used for its DMRS port(s) transmission and whether the remaining set is used with data or without data.

For a UE, if the set index corresponding to DMRS port indication field is x, the UE can assume set(s) with lower set index than x has been allocated to DMRSes of other UEs, so the set(s) with lower set index than x may not be used for data for this UE.

D. Process of Configuring Resource Elements in Demodulation Reference Signals

Figure 9:
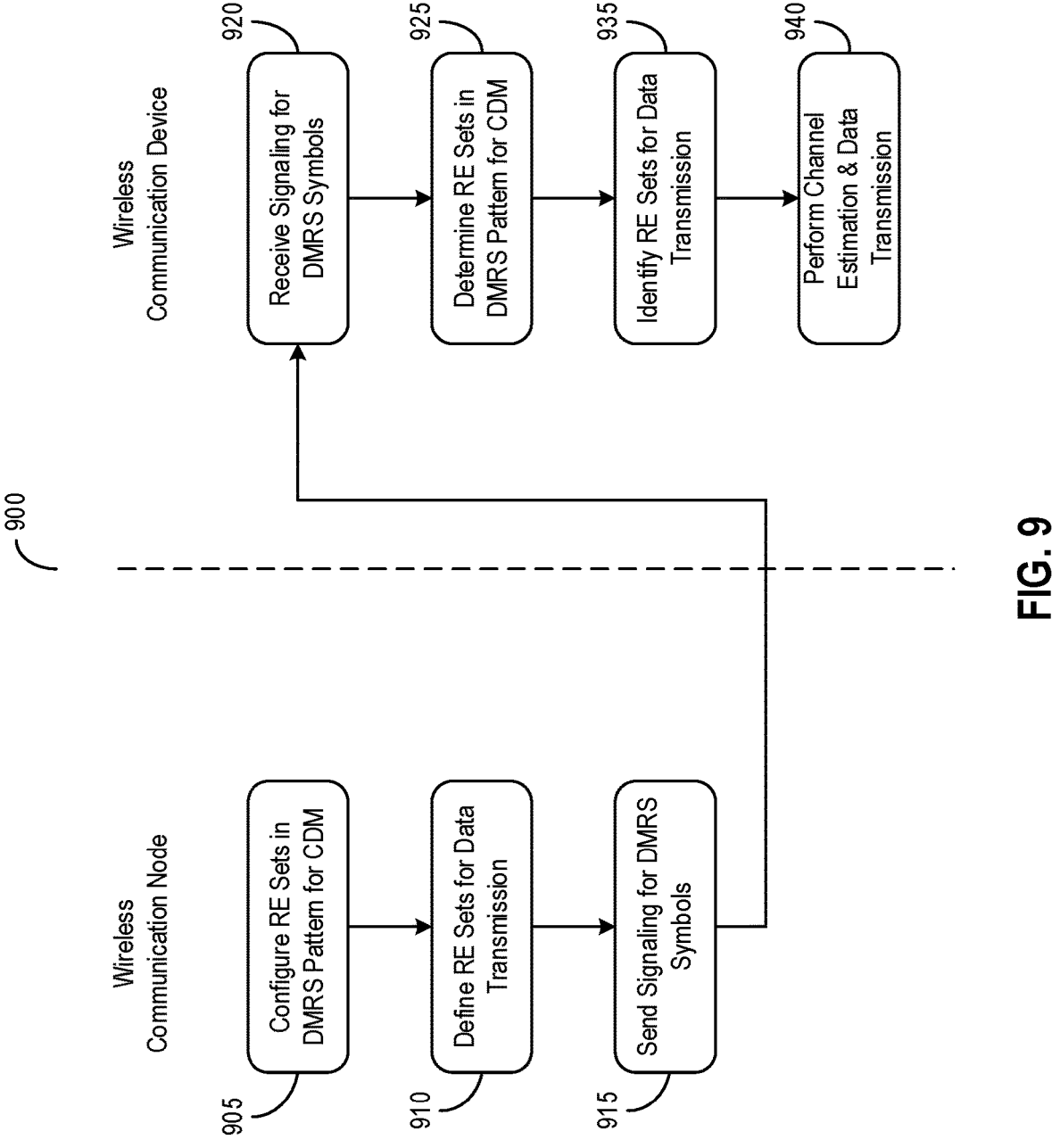
FIG. 9 illustrates a flow diagram of a method of configuring resource elements (REs) in demodulation reference signals (DMRS) in accordance with an illustrative embodiment.

Referring now to FIG. 9, depicted is a flow diagram of a method 900 of configuring resource elements (REs) in demodulation reference signals (DMRS). The method 900 may be implemented using or performed by any of the components detailed above, such as the UE 104 or 204 and BS 102 or 202, among others. In brief overview, a wireless communication node may configure resource element (RE) sets in a DMRS pattern for code division multiplexing (CDM) (905). The wireless communication node may define RE sets for data transmission (910). The wireless communication node may send a signaling for DMRS symbols (915). A wireless communication device may receive the signaling for DMRS symbols (920). The wireless communication device may determine RE sets in the DMRS pattern for CDM (925). The wireless communication device may identify RE sets for data transmission (935). The wireless communication device may perform channel estimation and data transmission (940).

In further detail, a wireless communication node (e.g., the BS 102 or 202) may determine, identify, or otherwise configure resource element sets in a DMRS pattern for CDM (905). In some embodiments, the wireless communication node may configure the DMRS pattern of a defined format semi-statically (e.g., using AI or ML). The DMRS pattern may identify a mapping between one or more resource element sets of a plurality of resource element sets and a CDM group index. The resource elements mapped to one of the CDM group indices may be defined to exclude data transmission, and instead for DMRS. Each of the plurality of the resource element sets may identify or include at least one CDM group. Each CDM group may identify or include one or more resource elements on which corresponding DMRS ports are to be multiplexed. The plurality of resource element sets may include a first set and a second set. The first set may correspond to or include resource elements of indices 0-5 and the second set may correspond to or include resource elements of indices 6-11. In some embodiments, the wireless communication node may further configure that the DMRS ports of a wireless communication device (e.g., UE 104 or 204) are mapped onto a CDM group of index 0 in a first set of a plurality of resource element sets.

In some embodiments, the wireless communication node may configure the CDM groups in the DMRS pattern based on the DMRS symbols to be used. The DMRS symbol may include one front-loaded DMRS symbol or two adjacent front-loaded DMRS symbols. When one front-loaded DMRS symbol is to be used, at least one CDM group may identify or include a first CDM group in which DMRS ports 0 and 1 map on resource elements of indices 0 and 1. The at least one CDM group may identify or include a second CDM group in which DMRS ports 2 and 3 map on resource elements of indices 2 and 3. The at least one CDM group may identify or include a third CDM group in which DMRS ports 4 and 5 map on resource elements of indices 4 and 5. The at least one CDM group may identify or include a fourth CDM group in which DMRS ports 12 and 13 map on resource elements of indices 6 and 7. The at least one CDM group may identify or include fifth CDM group in which DMRS ports 14 and 15 map on resource elements of indices 8 and 9. The at least one CDM group may identify or include sixth CDM group in which DMRS ports 16 and 17 map on resource elements of indices 10 and 11. Any combination of the CDM groups may be used for the DMRS ports to map on the resource element indices.

In addition, when two front-loaded DMRS symbols are to be used, at least one CDM group may identify or include a first CDM group in which DMRS ports 0, 1, 6 and 7 map on resource elements of indices 0 and 1. At least one CDM group may identify or include a second CDM group in which DMRS ports 2, 3, 8 and 9 map on resource elements of indices 2 and 3. At least one CDM group may identify or include a third CDM group in which DMRS ports 4, 5, 10 and 11 map on resource elements of indices 4 and 5. At least one CDM group may identify or include a fourth CDM group in which DMRS ports 12, 13, 18 and 19 map on resource elements of indices 6 and 7. At least one CDM group may identify or include a fifth CDM group in which DMRS ports 14, 15, 20 and 21 map on resource elements of indices 8 and 9. At least one CDM group may identify or include a sixth CDM group in which DMRS ports 16, 17, 22 and 23 map on resource elements of indices 10 and 11. Any combination of the CDM groups may be used for the DMRS ports to map on the resource element indices.

The DMRS ports of the wireless communication device may be mapped to resource elements of a resource element set. In some embodiments, DMRS ports 0 and 1 may be mapped to resource elements of indices 0 and 1 in a first CDM group, DMRS ports 2 and 3 may be mapped to resource elements of indices 2 and 3 in a second CDM group, and DMRS ports 4 and 5 may be mapped to resource elements of indices 4 and 5 in a third CDM group. In some embodiments, DMRS ports 0 and 1 may be mapped to resource elements of indices 6 and 7 in a first CDM group, DMRS ports 2 and 3 may be mapped to resource elements of indices 8 and 9 in a second CDM group, and DMRS ports 4 and 5 may be mapped to resource elements of indices 10 and 11 in a third CDM group.

In some embodiments, DMRS ports 0, 1, 6 and 7 may be mapped to resource elements of indices 0 and 1 in a first CDM group, DMRS ports 2, 3, 8 and 9 may be mapped to resource elements of indices 2 and 3 in a second CDM group, and DMRS ports 4, 5, 10 and 11 may be mapped to resource elements of indices 4 and 5 in a third CDM group. In some embodiments, DMRS ports 0, 1, 6 and 7 may be mapped to resource elements of indices 6 and 7 in a first CDM group, DMRS ports 2, 3, 8 and 9 may be mapped to resource elements of indices 8 and 9 in a second CDM group, and DMRS ports 4, 5, 10 and 11 may be mapped to resource elements of indices 10 and 11 in a third CDM group.

The wireless communication node may identify, determine, or otherwise define resource element (RE) sets for data transmission (910). In some embodiments, the wireless communication node may configure the DMRS pattern to specify that one or more resource element sets of the plurality of resource element sets is not mapped to any CDM group. In some embodiments, the wireless communication node may identify or predefine that the remaining resource element sets of the plurality of resource elements are for data transmission. In defining, the wireless communication node may identify resource element sets not mapped to any CDM group. The remaining resource elements may be defined to exclude DMRS. With the identification, the wireless communication may assign the resource element sets that are not mapped to any CDM group for data transmission.

The wireless communication node may transmit, provide, or otherwise send a signaling for DMRS symbols to a wireless communication device (e.g., the UE 104 or 204) (915). The wireless communication node may send the signaling to indicate whether at least one resource element set of the plurality of resource element sets in at least one DMRS symbol is to be used for the data transmission that excludes DMRS. The indication by the signaling may specify, define, or identify whether at least one resource element set is to be used for: (i) data transmission instead of DMRS or (ii) transmission excluding data or DMRS (e.g., information besides the data or DMRS, or no transmission at all). In some embodiments, the indication by the signaling (or a separate signaling sent by the wireless communication node) may specify, define, or identify whether the DMRS pattern of the physical resource block (PRB) is to be of a first format (e.g., new format) or a second format (e.g., legacy format).

The signaling may include downlink control information (DCI). The DCI (sometimes referred to as DCI signaling) may include one or more fields used to indicate the mapping between the resource element sets and the CDM groups. The DCI or signaling may indicate whether at least one resource element set is to be used for data transmission excluding DMRS via an DMRS port indication field or another field. In some embodiments, the DMRS port indication field of the DCI may identify or indicate a number of DMRS symbols that are front-loaded. In some embodiments, the DMRS port indication field of the DCI may identify or indicate a CDM group within the first set that is not for transmission of data. In some embodiments, the DCI may identify or indicate which of the plurality of resource element sets is to be used for transmission of DMRS. In some embodiments, the DCI may identify or indicate whether a remaining resource element set of the plurality of resource element sets is to be used for data transmission. In some embodiments, the DMRS port indication field may identify or indicate whether at least one CDM group in the N-th set is to be used for transmission that excludes data (e.g., that includes DMRS or other non-data signal).

In turn, the wireless communication device may identify, retrieve, or otherwise receive the signaling for DMRS symbols from the wireless communication node (920). The wireless communication device may receive the signaling indicating whether at least one resource element set of the plurality of resource element sets of at least one DMRS symbol is to be used for data transmission excluding the DMRS. Upon receipt, the wireless communication device may parse the signaling to extract or identify the DCI. With the indication, the wireless communication device may identify the one or more fields of the DCI. From the fields of the DCI, the wireless communication device may identify the mapping between the resource element sets and the CDM groups. In some embodiments, the wireless communication device may identify the number of DMRS symbols that are front-loaded from the DMRS port indication field of the DCI.

The wireless communication device may identify or determine the resource element sets in the DMRS pattern for CDM (925). In some embodiments, the wireless communication device may identify or determine that the DMRS pattern for the defined format is enabled semi-statically (e.g., using AI or ML). The wireless communication device may identify or determine that the DMRS ports of the wireless communication device are mapped on the CDM group of index 0 in the first resource element set of the plurality of resource element sets. From the DCI of the signaling, the wireless communication device may identify which of the plurality of resource element sets is to be used for transmission of DMRS. In some embodiments, the wireless communication device may determine that one or more resource element sets preceding the N-th set are to be used for transmission excluding the data (e.g., DMRS), if the DCI indicates that the N-th set are to be used for transmission excluding the data.

The wireless communication device may determine or identify resource element sets for data transmission (935). In some embodiments, the wireless communication device may identify or determine that the remaining resource element sets of the plurality of resource element sets are for data transmission (e.g., excluding transmission of DMRS). The determination by the wireless communication device may be based on indication in the DCI or signaling. From the DCI, the wireless communication device may identify which resource element sets of the plurality of resource elements are to be used for the data transmission.

The wireless communication device may perform channel estimation and data transmission (940). The wireless communication device may use the resource element sets to carry out channel estimation (e.g., via DMRS) and the data transmission in accordance with the indication by the signaling received from the wireless communication node. Using the resource element sets indicated as excluding DMRS, the wireless communication device may use the corresponding resource element sets to perform the data transmission. Conversely, using the resource element sets indicated as excluding data transmission, the wireless communication device may use the corresponding resource element sets to perform channel estimation via DMRS. In carrying out the channel estimation, the wireless communication device may apply multiplexing on the DMRS ports as indicated in the signaling in accordance with CDM.

While various embodiments of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described illustrative embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device.

A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present solution.

Additionally, memory or other storage, as well as communication components, may be employed in embodiments of the present solution. It will be appreciated that, for clarity purposes, the above description has described embodiments of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the embodiments described in this disclosure will be readily apparent to those skilled in the art, and the general principles defined herein can be applied to other embodiments without departing from the scope of this disclosure. Thus, the disclosure is not intended to be limited to the embodiments shown herein, but is to be accorded the widest scope consistent with the novel features and principles disclosed herein, as recited in the claims below.

The invention claimed is:

1. A method comprising:
   receiving, by a wireless communication device from a wireless communication node, downlink control information (DCI) indicating whether at least one set of a plurality of sets of resource elements of at least one demodulation reference signal (DMRS) symbol, is to be used for transmission that excludes DMRS, wherein each of the plurality of sets includes at least one code division multiplex (CDM) group, each of the at least one CDM group including resource elements on which corresponding DMRS ports are multiplexed, and
   when the DCI indicates that an N-th set of the plurality of sets is to be used for the transmission of DMRS, determining, by the wireless communication device, that one or more sets preceding the N-th set are to be used for transmission that excludes data.

2. The method of claim 1, wherein the at least one DMRS symbol comprises one front-loaded DMRS symbol or two adjacent front-loaded DMRS symbols.

3. The method of claim 1, wherein indicating whether the at least one set is to be used for transmission that excludes DMRS comprises indicating whether the at least one set is to be used for transmission of data instead of DMRS or for transmission that excludes data or DMRS.

4. The method of claim 3, wherein the plurality of sets includes a first set that comprises resource elements of indices 0-5, and a second set that comprises resource elements of indices 6-11.

5. The method of claim 1, wherein the DCI indicates whether the at least one set is to be used for transmission that excludes DMRS, via a DMRS port indication field or another field in the DCI.

6. The method of claim 1, comprising:
   determining, by the wireless communication device, that a DMRS pattern of a defined format is enabled semi-statically, and that DMRS ports of the wireless communication device are mapped on a CDM group of index 0 in the at least one set of the plurality of sets of resource elements; and
   determining, by the wireless communication device, that remaining sets of the plurality of sets are for transmission of data.

7. The method of claim 1, wherein the at least one CDM group includes at least one of:
   a first CDM group in which DMRS ports 0 and 1 map on resource elements of indices 0 and 1,
   a second CDM group in which DMRS ports 2 and 3 map on resource elements of indices 2 and 3, or
   a third CDM group in which DMRS ports 4 and 5 map on resource elements of indices 4 and 5,
   a fourth CDM group in which DMRS ports 12 and 13 map on resource elements of indices 6 and 7,
   a fifth CDM group in which DMRS ports 14 and 15 map on resource elements of indices 8 and 9, or
   a sixth CDM group in which DMRS ports 16 and 17 map on resource elements of indices 10 and 11.

8. The method of claim 1, wherein the at least one CDM group includes at least one of:
   a first CDM group in which DMRS ports 0, 1, 6 and 7 map on resource elements of indices 0 and 1,
   a second CDM group in which DMRS ports 2, 3, 8 and 9 map on resource elements of indices 2 and 3,
   a third CDM group in which DMRS ports 4, 5, 10 and 11 map on resource elements of indices 4 and 5,
   a fourth CDM group in which DMRS ports 12, 13, 18 and 19 map on resource elements of indices 6 and 7,
   a fifth CDM group in which DMRS ports 14, 15, 20 and 21 map on resource elements of indices 8 and 9, or
   a sixth CDM group in which DMRS ports 16, 17, 22 and 23 map on resource elements of indices 10 and 11.

9. The method of claim 1, wherein at least one of:
   DMRS ports of the wireless communication device is mapped to resource elements of a first set of the plurality of sets;

the DCI from the wireless communication node includes a DMRS port indication field that indicates at least one of: number of DMRS symbols that are front-loaded, or a CDM group within the first set that is not for transmission of data; or the DCI indicates at least one of: which of the plurality of sets is to be used for transmission of DMRS, or whether a remaining set of the plurality of sets is to be used for the transmission of data.

10. The method of claim 9, wherein the DMRS port indication field indicates whether at least one CDM group in the N-th set is to be used for transmission that excludes data.

11. A method comprising:

sending, by a wireless communication node to a wireless communication device, downlink control information (DCI) indicating whether at least one set of a plurality of sets of resource elements of at least one demodulation reference signal (DMRS) symbol, is to be used for transmission that excludes DMRS, wherein each of the plurality of sets includes at least one code division multiplex (CDM) group, each of the at least one CDM group including resource elements on which corresponding DMRS ports are multiplexed, and when the DCI indicates that an N-th set of the plurality of sets is to be used for the transmission of DMRS, the wireless communication device determines that one or more sets preceding the N-th set are to be used for transmission that excludes data.

12. The method of claim 11, wherein the at least one DMRS symbol comprises one front-loaded DMRS symbol or two adjacent front-loaded DMRS symbols.

13. The method of claim 11, wherein indicating whether the at least one set is to be used for transmission that excludes DMRS comprises indicating whether the at least one set is to be used for transmission of data instead of DMRS or for transmission that excludes data or DMRS.

14. The method of claim 13, wherein the plurality of sets includes a first set that comprises resource elements of indices 0-5, and a second set that comprises resource elements of indices 6-11.

15. The method of claim 11, wherein the DCI indicates whether the at least one set is to be used for transmission that excludes DMRS, via a DMRS port indication field or another field in the DCI.

16. The method of claim 11, comprising:

configuring, by the wireless communication node, a DMRS pattern of a defined format semi-statically, and that DMRS ports of the wireless communication device are mapped on a CDM group of index 0 in a first set of the plurality of sets; and predefining or indicating, by the wireless communication node, that remaining sets of the plurality of sets are for transmission of data.

17. The method of claim 11, wherein the at least one CDM group includes at least one of:

a first CDM group in which DMRS ports 0 and 1 map on resource elements of indices 0 and 1, a second CDM group in which DMRS ports 2 and 3 map on resource elements of indices 2 and 3, or a third CDM group in which DMRS ports 4 and 5 map on resource elements of indices 4 and 5, a fourth CDM group in which DMRS ports 12 and 13 map on resource elements of indices 6 and 7, a fifth CDM group in which DMRS ports 14 and 15 map on resource elements of indices 8 and 9, or a sixth CDM group in which DMRS ports 16 and 17 map on resource elements of indices 10 and 11.

18. A wireless communication device comprising:

at least one processor configured to:

receive, via a receiver from a wireless communication node, downlink control information (DCI) indicating whether at least one set of a plurality of sets of resource elements of at least one demodulation reference signal (DMRS) symbol, is to be used for transmission that excludes DMRS, wherein each of the plurality of sets includes at least one code division multiplex (CDM) group, each of the at least one CDM group including resource elements on which corresponding DMRS ports are multiplexed, and when the DCI indicates that an N-th set of the plurality of sets is to be used for the transmission of DMRS, determine that one or more sets preceding the N-th set are to be used for transmission that excludes data.

19. A wireless communication node, comprising:

at least one processor configured to:

send, via a transmitter to a wireless communication device, downlink control information (DCI) indicating whether at least one set of a plurality of sets of resource elements of at least one demodulation reference signal (DMRS) symbol, is to be used for transmission that excludes DMRS, wherein each of the plurality of sets includes at least one code division multiplex (CDM) group, each of the at least one CDM group including resource elements on which corresponding DMRS ports are multiplexed, and if the DCI indicates that an N-th set of the plurality of sets is to be used for the transmission of DMRS, the wireless communication device determines that one or more sets preceding the N-th set are to be used for transmission that excludes data.

* * * * *